United States Patent
Alonichau et al.

(10) Patent No.: US 12,242,807 B2
(45) Date of Patent: Mar. 4, 2025

(54) TOKENIZING ALPHANUMERIC TEXT THROUGH USE OF FINITE STATE MACHINES

(71) Applicant: Microsoft Technology Licensing, LLC, Redmond, WA (US)

(72) Inventors: Siarhei Alonichau, Seattle, WA (US); Junaid Ahmed, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 248 days.

(21) Appl. No.: 17/190,344

(22) Filed: Mar. 2, 2021

(65) Prior Publication Data
US 2022/0284190 A1  Sep. 8, 2022

(51) Int. Cl.
*G06F 40/284* (2020.01)
*G06F 40/237* (2020.01)
*G06F 40/289* (2020.01)

(52) U.S. Cl.
CPC ................................ *G06F 40/284* (2020.01)

(58) Field of Classification Search
CPC ...... G06F 40/20; G06F 40/205; G06F 40/279; G06F 40/284; G06F 40/289; G06F 40/237
USPC .................................................. 704/1, 9, 10
See application file for complete search history.

(56) References Cited

U.S. PATENT DOCUMENTS

| | | | | |
|---|---|---|---|---|
| 4,241,402 A | * | 12/1980 | Mayper, Jr. ....... | G06F 16/90344 |
| 5,450,598 A | * | 9/1995 | Kaplan ............. | G06F 16/90344 |
| | | | | 715/201 |
| 5,721,939 A | * | 2/1998 | Kaplan ................. | G06F 40/284 |
| | | | | 704/9 |
| 5,754,847 A | * | 5/1998 | Kaplan ............. | G06F 16/90344 |
| | | | | 704/10 |
| 6,269,189 B1 | * | 7/2001 | Chanod ................... | G06F 40/20 |
| | | | | 382/229 |
| 6,990,442 B1 | * | 1/2006 | Davis .................... | G06F 40/284 |
| | | | | 704/9 |
| 7,693,827 B2 | | 4/2010 | Zamir et al. | |
| 7,840,913 B1 | * | 11/2010 | Agrawal .................. | G06F 8/35 |
| | | | | 717/109 |

(Continued)

FOREIGN PATENT DOCUMENTS

| CN | 111198995 A | | 5/2020 |
|---|---|---|---|
| EP | 0854468 A2 | * | 7/1998 |

(Continued)

OTHER PUBLICATIONS

Abdallah Ashraf, "Tokenization in NLP: All you need to know", Medium, Jan. 30, 2024, 15 Pages. https://medium.com/@abdallahashraf90x/tokenization-in-nlp-all-you-need-to-know-45c00cfa2df7 (Year: 2024).*

(Continued)

*Primary Examiner* — Martin Lerner
(74) *Attorney, Agent, or Firm* — CALFEE, HALTER & GRISWOLD LLP (57) ABSTRACT

Described herein are technologies related to tokenizing alphanumeric text through use of a tokenization algorithm that is at least partially implemented as a finite state machine. The tokenization algorithm is configured to output numeric identifiers that represent tokens or sub-tokens in the alphanumeric text.

10 Claims, 7 Drawing Sheets

(56) References Cited

U.S. PATENT DOCUMENTS

| | | | |
|---|---|---|---|
| 7,937,263 | B2* | 5/2011 | Carrier .................. G06F 40/284 704/10 |
| 8,938,408 | B1 | 1/2015 | Serdyukov et al. |
| 9,298,824 | B1 | 3/2016 | Vinnik |
| 10,839,156 | B1* | 11/2020 | Saxena .................. G06F 40/30 |
| 11,200,288 | B1 | 12/2021 | Baker et al. |
| 11,277,443 | B2 | 3/2022 | Onut et al. |
| 11,294,974 | B1 | 4/2022 | Shukla et al. |
| 2003/0074183 | A1* | 4/2003 | Eisele .................. G06F 40/216 704/1 |
| 2003/0149562 | A1* | 8/2003 | Walther ................ G06F 40/284 704/243 |
| 2006/0064411 | A1 | 3/2006 | Gross et al. |
| 2008/0071802 | A1* | 3/2008 | Lucco .................. G06F 40/143 |
| 2008/0208566 | A1* | 8/2008 | Alonichau ............ G06F 40/284 704/9 |
| 2008/0301139 | A1 | 12/2008 | Wang et al. |
| 2009/0024583 | A1 | 1/2009 | Jaiswal et al. |
| 2010/0023318 | A1* | 1/2010 | Lemoine ............... G06F 40/289 704/10 |
| 2010/0161313 | A1* | 6/2010 | Karttunen ............. G06F 40/289 704/9 |
| 2011/0119268 | A1 | 5/2011 | Rajaram et al. |
| 2011/0208730 | A1 | 8/2011 | Jiang et al. |
| 2011/0276577 | A1* | 11/2011 | Yao ..................... G06F 16/9535 707/750 |
| 2014/0095495 | A1 | 4/2014 | Brukman et al. |
| 2014/0358911 | A1 | 12/2014 | Mccarthy et al. |
| 2018/0246899 | A1 | 8/2018 | Natchu et al. |
| 2018/0253496 | A1 | 9/2018 | Natchu |
| 2019/0287685 | A1* | 9/2019 | Wu ....................... G06F 40/284 |
| 2019/0347668 | A1 | 11/2019 | Williams et al. |
| 2020/0213336 | A1 | 7/2020 | Yu et al. |
| 2020/0265327 | A1* | 8/2020 | Kwiatkowski .......... G06F 40/30 |
| 2021/0027114 | A1* | 1/2021 | Lee ....................... G06F 40/284 |
| 2021/0202045 | A1 | 7/2021 | Neumann |
| 2021/0374347 | A1* | 12/2021 | Yang .................... G06F 40/284 |
| 2022/0107802 | A1 | 4/2022 | Rao et al. |
| 2022/0164535 | A1* | 5/2022 | Berns .................... G06F 40/284 |
| 2022/0253502 | A1 | 8/2022 | Alonichau et al. |
| 2023/0342410 | A1 | 10/2023 | Alonichau et al. |

FOREIGN PATENT DOCUMENTS

| | | | |
|---|---|---|---|
| EP | 3401796 A1 * | 11/2018 | .......... G06F 40/205 |
| GB | 2528030 A | 1/2016 | |

OTHER PUBLICATIONS

Alonichau, Sergei, "How to Train Better Language Detection with Bling Fire and FastText", Retrieved From https://github.com/microsoft/BlingFire/wiki/How-to-train-better-language-detection-with-Bling-Fire-and-FastText, Retrieved on Nov. 28, 2020, 5 Pages.

Alonichau, Sergei, "Microsoft / BlingFire", Retrieved From https://github.com/Microsoft/BlingFire, Nov. 7, 2020, 10 Pages.

Kudo, Taku, "Google / Sentencepiece", Retrieved From https://github.com/google/sentencepiece, Retrieved on Nov. 28, 2020, 9 Pages.

Wu, et al., "Google's Neural Machine Translation System: Bridging the Gap Between Human and Machine Translation", In Repository of arXiv:1609.08144v2, Sep. 26, 2016, 23 Pages.

"nltk.tokenize package", Retrieved From: https://www.nltk.org/api/nltk.tokenize.html, Retrieved on Mar. 2, 2021, 25 Pages.

Kudo, Taku, "Subword Regularization: Improving Neural Network Translation Models with Multiple Subword Candidates", In arXiv:1804.10959v1, 2018, 10 Pages.

Sennrich, et al., "Neural Machine Translation of Rare Words with Subword Units", In arXiv:1508.07909, 2016, 11 Pages.

"Web Crawler—Wikipedia", Retrieved from: https://en.wikipedia.org/w/index.php?title=Web_crawler&oldid=484793229, Mar. 31, 2012, 2 Pages.

Cho, et al., "Efficient Crawling through URL Ordering", In Journal of Computer Networks and ISDN Systems, vol. 30, Apr. 1998, 20 Pages.

"International Search Report and Written Opinion Issued in PCT Application No. PCT/US22/013033", Mailed Date: Mar. 25, 2022, 10 Pages.

"Non Final Office Action Issued in U.S. Appl. No. 17/168,665", Mailed Date: Oct. 24, 2022, 31 Pages.

"Notice of Allowance Issued in U.S. Appl. No. 17/168,665", Mailed Date: Mar. 31, 2023, 17 Pages.

Anonymous: "Web crawler—Wikipedia", Mar. 31, 2012, 7 pages.

Cho, et al.,"Efficient crawling through URL ordering," Computer networks and ISDN systems, Jan. 1, 1998, pp. 161-172.

EPO Notification Rule 94(3) received in European Application No. 22703763.7, mailed on Jun. 14, 2024, 5 pages.

* cited by examiner

TOKENIZING ALPHANUMERIC TEXT THROUGH USE OF FINITE STATE MACHINES

RELATED DOCUMENTS

The following documents describe tokenization algorithms, and the documents are incorporated by reference in their entireties: (1) The Natural Language Toolkit (NLTK) tokenization algorithm is described in the NLTK 3.5 documentation; (2) the Word Piece tokenization algorithm is described in Wu, et al., "Google's Neural Machine Translation System: Bridging the Gap Between Human and Machine Translation,", arXiv: 1609.08144, 2016, pages 1-23; (3) the Unigram Language Model (LM) tokenization algorithm is described in Kudo, "Subword Regularization: Improving Neural Network Translation Models With Multiple Subword Candidates", arXiv: 1804.10959v1, 2018, pages 1-10; (4) the Byte Pair Encoding (BPE) tokenization algorithm is described in Sennrich, et al., "Neural Machine Translation of Rare Words with Subword Units", arXiv: 1508.07909, 2016, pages 1-11.

BACKGROUND

Tokenizers (also referred to as word breakers) are employed to break alphanumeric text into a sequence of tokens. Conventionally, alphanumeric text is provided to a tokenizer, which breaks the alphanumeric text into sub-parts (where the sub-parts may be words, syllables, individual characters, etc.). Some tokenizers map numeric identifiers to respective sub-parts—thus, in an example, the tokenizer breaks the alphanumeric string "wordbreaking example" into the sub-parts "word", "break", "ing", and "example", and outputs the numeric identifiers [26], [215], [15], and [1534], as "word" is mapped to the identifier [26], "break" is mapped to the identifier [215], and so on. This sequence of identifiers is subjected to embedding, resulting in output of a sequence of vectors, with each vector representing semantics of a respective sub-part of the numeric identifier represented by the vector. A computer-implemented text classifier is provided with the sequence of vectors and assigns a class (e.g., a topic, an answer to a question included in the text, etc.) to the alphanumeric text based upon the sequence of vectors.

The process of tokenizing alphanumeric text, subjecting the resultant tokens to embedding, and then performing text classification with respect to the alphanumeric text is a computationally expensive process, with the computational expense increasing as complexity of text classifiers increases. However, text classification is desirably performed very quickly (on the order of microseconds)—thus, there is a tension between improving text classifiers, which will add more computational expense (and therefore require more time than if a less complex classifier is employed), and ensuring that the text classification process is completed quickly.

Upon testing a text classification pipeline, it was discovered that an inordinate amount of time was spent on tokenization; this is at least partially due to tokenization being better suited for performance on a central processing unit (CPU) rather than graphics processing units (GPUs). It can be ascertained that if time required to perform tokenization is reduced, more complex text classifiers can be employed to perform text classification, resulting in improved performance in a text classification pipeline.

SUMMARY

The following is a brief summary of subject matter that is described in greater detail herein. This summary is not intended to be limiting as to the scope of the claims.

Described herein are various technologies pertaining to tokenizing alphanumeric text, where tokenization algorithms implemented as finite state machines are utilized in connection with performing the tokenization. Classes of tokenization algorithms that can be implemented as finite state machines include classes of tokenization algorithms that are configured to output numeric identifiers (IDs) that represent tokens and/or sub-tokens in alphanumeric text, such as, but not limited to, tokenization algorithms of a Word Piece class (which include the Word Piece tokenization algorithm described in reference (2) and derivations thereof), tokenization algorithms of a Unigram LM class (which include the Unigram LM tokenization algorithm described in reference (3) and derivations thereof), and tokenization algorithms of a Byte Pair Encoding (BPE) class (which include the BPE tokenization algorithm described in reference (4). In addition, tokenization algorithms that can be implemented as finite state machines include tokenization algorithms that are pattern-based (e.g., that are configured to search through the alphanumeric text for patterns), such as, but not limited to, the Natural Language Toolkit (NLTK) tokenization algorithm described in reference (1).

In addition, a tokenization system described herein supports multiple tokenization algorithms, where each of the multiple tokenization algorithms is at least partially implemented as a finite state machine. Further, at least one of the tokenization algorithms is implemented as a deterministic finite state machine, although it is to be understood that multiple of the tokenization algorithms can be implemented as deterministic finite state machines. Pursuant to an example, a first tokenization algorithm in the tokenization algorithms is at least partially implemented as a Moore machine, while a second tokenization algorithm in the tokenization algorithms is at least partially implemented as a Mealy machine. In a specific example, the NLTK tokenization algorithm and a Word Piece class tokenization algorithm are at least partially implemented as Moore machines, and a BPE class and a unigram LM class tokenization algorithms are at least partially implemented as Mealy machines.

In operation, a user may submit a request that identified alphanumeric text be subjected to text classification, where the request includes an identity of a text classifier from amongst a plurality of potential text classifiers that is to perform the text classification. Upon receipt of the request, a tokenization algorithm from amongst several potential tokenization algorithms is selected, where the tokenization algorithm is selected based upon the identity of the text classifier included in the request. The alphanumeric text is then subjected to tokenization by the selected tokenization algorithm, where the tokenization algorithm is at least partially implemented as a finite state machine.

The technologies described herein exhibit various advantages over conventional approaches for tokenizing alphanumeric text. For instance, a single interface is provided to end users, where the end users are able to access multiple different tokenization algorithms. Moreover, conventionally, tokenization algorithms have been implemented through use of various loops in code (e.g., "if-then" loops and/or "for-while" loops). By at least partially implementing the tokenization algorithms as finite state machines, the tokenization algorithms execute several orders of magnitude more quickly than conventionally-implemented tokenization algorithms.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining generally to text classification, and more particularly to tokenizing alphanumeric text through use of tokenization algorithms implemented as finite state machines, are now described with reference to the drawings, where like reference numerals are used to refer to like elements throughout.

Described herein our technologies that relate to improving speed at which alphanumeric text is tokenized (i.e., reducing processing cycles required to tokenize alphanumeric text), thereby allowing for increasingly complex (and increasingly accurate) computer-implemented text classifiers to classify alphanumeric text without increasing overall time to classify the alphanumeric text in a text classification pipeline. With more specificity, tokenization algorithms are at least partially implemented as deterministic finite state machines. Accordingly, such tokenization algorithms are executed much more efficiently when compared to conventionally-implemented tokenization algorithms, which have heretofore been implemented through employment of code that includes numerous loops (e.g., "for-while" loops and "if-then" loops). In addition, the technologies described herein provide a single interface by way of which multiple different tokenization algorithms (which tokenize alphanumeric text differently) are accessible to end users.

For instance, a request to classify alphanumeric text is received from an end user, where the request includes an identity of a text classifier (from amongst several available text classifiers) that is to classify the alphanumeric text. Based upon the identity of the text classifier, a tokenization algorithm is selected from amongst several available tokenization algorithms, where the tokenization algorithms are at least partially implemented as deterministic finite state machines. In a specific example, NLTK and Word Piece class tokenization algorithms are at least partially implemented as Moore machines, and Unigram LM and BPE class tokenization algorithms are at least partially implemented as Mealy machines.

Figure 1:
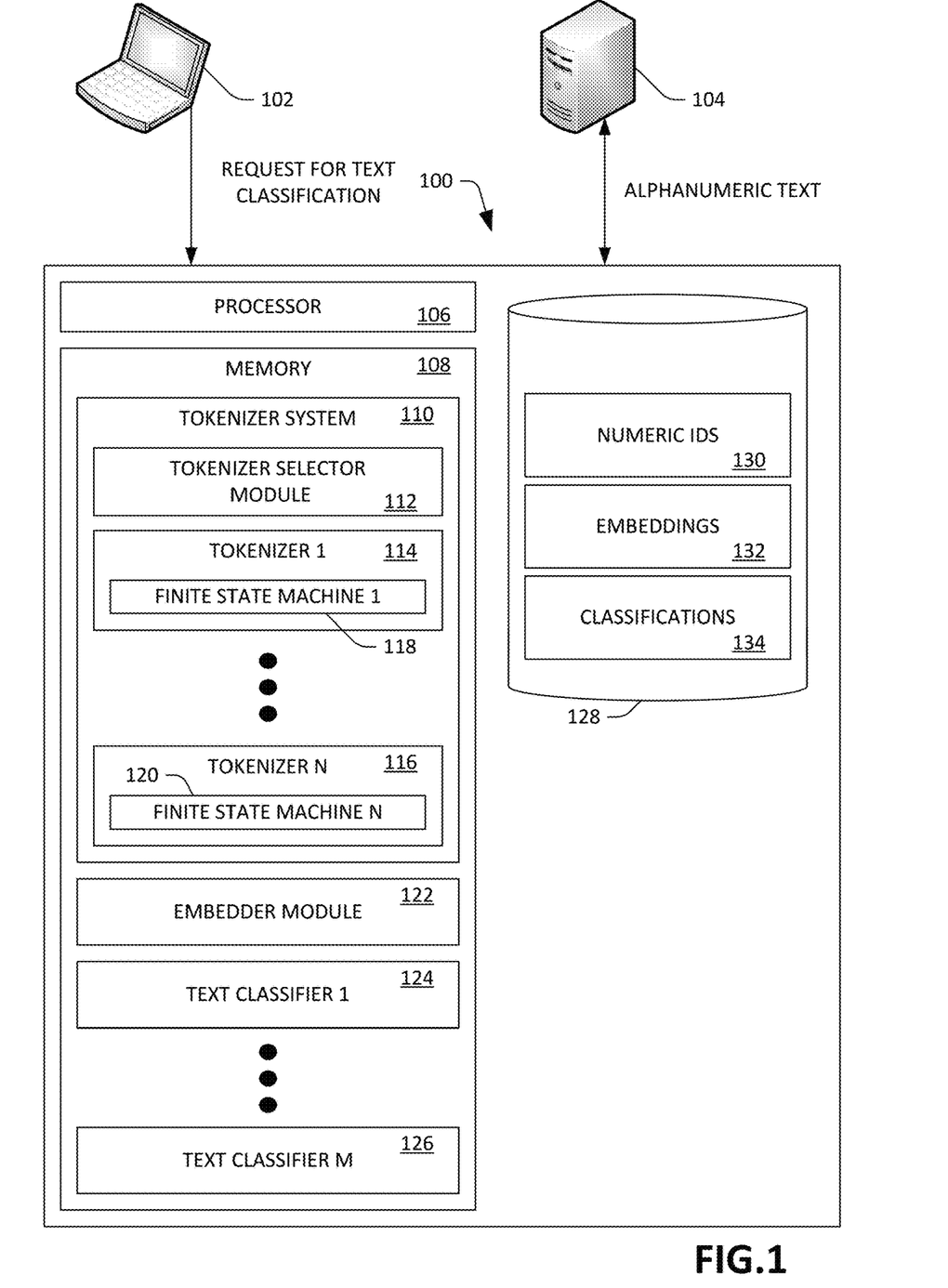
FIG. 1 is a functional block diagram of a computing system that is configured to perform text classification with respect to alphanumeric text.

Referring now to FIG. 1, a computing system 100 that is configured to perform text classification with respect to alphanumeric text is illustrated. The computing system 100 is in communication with a computing device 102 by way of a network (not shown), where optionally the computing device 102 is operated by a user (not shown) who sets forth a request to perform text classification with respect to alphanumeric text. The request includes alphanumeric text or an indication of a location of the alphanumeric text. The request additionally includes an identifier of a text classifier from amongst several available text classifiers. The computing system 100 is additionally in communication with a server computing system 104 by way of the network. In an example, the server computing system 104 is or includes a web server that hosts a website, where the website comprises the alphanumeric text identified in the request. The website may be a news website, a social media website, or other suitable website that includes the alphanumeric text identified in the request. Accordingly, the alphanumeric text may be or include a news story, a social media post, a social media broadcast, social media comments, alphanumeric text on an e-commerce page, etc. Upon the computing system 100 receiving the location of the alphanumeric text, the computing system 100 retrieves the alphanumeric text from the server computing system 104.

The computing system 100 includes a processor 106 and memory 108, where the memory 108 includes data that is accessible to the processor 106 and instructions that are executed by the processor 106. The memory 108 includes a tokenizer system 110, where the tokenizer system 110 includes a tokenizer selector module 112 and a plurality of tokenizers 114-116. Each of the tokenizers 114-116 is configured to partition alphanumeric text into tokens (and/or sub-tokens). Further, a tokenizer in the tokenizers 114-116 is configured to output numeric identifiers (IDs) that represent alphanumeric text tokenized by the tokenizer. Optionally, a tokenizer in the tokenizers 114-116 is configured to output tokens based upon patterns recognized by the tokenizer.

In addition, each of the tokenizers 114-116 includes a respective tokenization algorithm. For instance, the first tokenizer 114 includes the NLTK tokenization algorithm (which searches alphanumeric text for patterns and outputs tokens based upon the patterns), a second tokenizer in the plurality of tokenizers 114-116 includes the Word Piece tokenization algorithm, a third tokenizer in the plurality of tokenizers 114-116 includes the Unigram LM tokenization algorithm, and a fourth tokenizer in the plurality of tokenizers 114-116 includes the BPE tokenization algorithm, where the Word Piece tokenization algorithm, the Unigram LM tokenization algorithm, and the BPE tokenization algorithm output numeric IDs (from amongst a predefined set of numeric IDs) that represent alphanumeric text taken as input by such algorithms.

As illustrated in FIG. 1, the tokenizers 114-116 include respective finite state machines 118-120, where the tokenization algorithms of the respective tokenizers 114-116 are at least partially implemented as the finite state machines 118-120, and further where at least one of the finite state machines 118-120 is a minimal deterministic finite state machine. Further, at least one of the finite state machines 118-120 is a minimal deterministic Moore machine. Additionally, at least one of the finite state machines 118-120 is a minimal deterministic Mealy machine. In a specific example, the finite state machines that are implementations of the NLTK and Word Piece tokenization algorithms are minimal deterministic Moore machines, while the finite state machines that are implementations of the Unigram LM and BPE tokenization algorithms are minimal deterministic Mealy machines.

The computing system 100 also optionally includes an embedder module 122 that is configured to generate embeddings for outputs of the tokenizer modules 114-116. For example, with respect to a sequence of numeric identifiers (IDs) output by a tokenizer from the tokenizers 114-116, where the sequence of IDs represents tokens or sub-tokens in alphanumeric text tokenized by the tokenizer, the embedder module 122 generates a sequence of n-dimensional vectors, where each vector is a semantic representation of a token or sub-token represented by an ID in the sequence of IDs.

The computing system 100 further optionally includes several text classifiers 124-126. The text classifiers 124-126 are configured to perform text classification with respect to alphanumeric text, where the text classifiers 124-126 perform the text classification based upon outputs of the tokenizer modules 114-116 and output of the embedder module 122. The text classifiers 124-126 can be configured to perform any suitable text classification task, including but not limited to sentiment classification, news categorization, topic classification, question answering, natural language inference, amongst others. A text classifier in the text classifiers 124-126 that is configured to perform sentiment classification is configured to analyze content of alphanumeric text (e.g., product reviews, movie reviews, social media messages, etc.) and identify polarity and viewpoint of such alphanumeric text. The text classifier may be a binary classifier or a multiclass classifier. When the text classifier is a binary classifier, the text classifier is configured to classify input texts into positive and negative classes; when the text classifier is configured to perform sentiment classification and is a multiclass classifier, the text classifier classifies input texts into fine-grained labels or multilevel intensities (e.g., somewhat upset, very upset, etc.).

A text classifier in the text classifiers 124-126 that performs news categorization is configured to identify emerging news topics and/or recommend relevant news based upon known or inferred user interests. A text classifier in the text classifiers 124-126 that performs topic classification is configured to identify themes or topics of input texts (e.g., whether an input product review pertains to "customer support", "ease-of-use", etc.).

A text classifier in the text classifiers 124-126 that performs question answering tasks is configured to perform either extractive or generative tasks. Extractive question answering tasks pertain to when the text classifier assigns an input question to an existing class (e.g., the text classifier classifies a candidate answer as correct or not correct). Generative question answering tasks pertain to when the text classifier is configured to generate answers "on-the-fly".

A text classifier in the text classifiers 124-126 that performs natural language inference is configured to predict whether the meaning of one input text can be inferred from another. For instance, the text classifier can be configured to assign to a pair of text units a label such as entailment, contradiction, and neutral. Paraphrasing is a generalized form of natural language inference, such that the text classifier is configured to measure semantic similarity of a sentence pair, thereby indicating how likely one sentence is a paraphrase of the other. From the foregoing, it is to be understood that the text classifiers 124-126 can include classifiers that can be configured to perform any suitable text classification task.

Further, text classifiers in the text classifiers 124-126 can have any suitable structure. For instance, a text classifier may be or include a feed forward neural network, a recurrent neural network (RNN), (including a long short-term memory (LSTM-RNN)), a convolutional neural network (CNN), a capsule neural network, a model that includes an attention mechanism, a memory augmented network, a graph neural network (including a graph convolutional network), a hybrid model that, for instance, is a combination of LSTM and CNN architectures, a transformer based pretrained language model, etc.

The computing system 100 also includes a data store 128, where the data store is configured to retain numeric identifiers 130 output by at least one of the tokenizers 114-116 based upon alphanumeric text provided to the at least one tokenizer, embeddings 132 output by the embedder module 122, and classifications 134 assigned to the alphanumeric text.

An example of operation of the computing system 100 is now set forth. The computing system 100 receives a request for text classification from the computing device 102, where the request includes an indication of a location of alphanumeric text that is to be subject to text classification, and further where the request includes an identity of a text classifier from amongst the text classifiers 124-126, where the identified text classifier is to perform the text classification. In an example, the request includes an identity of the first text classifier 124.

Upon receiving the request, the computing system 100 retrieves the alphanumeric text from the server computing system 104, where the server computing system 104 is identified by the computing system 100 based upon the indication of the location of the alphanumeric text included in the request. The tokenizer selector module 112 selects a tokenizer from amongst the tokenizers 114-116 based upon the identity of the first text classifier 124 included in the request. For instance, the tokenizer selector module 112 selects the first tokenizer 114 from amongst the tokenizers 114-116 based upon the identity of the first text classifier 124 included in the request for text classification received from the computing device 102.

The first tokenizer 114 obtains the alphanumeric text, and the alphanumeric text is provided as input to a tokenization algorithm of the first tokenizer 114, where the first finite state machine 118 implements at least a portion of the tokenization algorithm. The tokenization algorithm tokenizes the alphanumeric text, such that the alphanumeric text is broken into numerous tokens and/or sub-tokens. Further, in this example, the first tokenizer 114 outputs the numeric IDs 130, which are retained in the data store 128. As described previously, the numeric IDs 130 represent tokens and/or sub tokens identified in the alphanumeric text by the first tokenizer 114.

The embedder module 122 obtains the numeric IDs 130 from the data store 128 and outputs the embeddings 132 based upon the numeric IDs 130, where the embeddings 132 are stored in the data store 128. The first text classifier 124, identified in the request for text classification received from the computing device 102, obtains the embeddings 132 and generates the classifications 134 for the alphanumeric text based upon the embeddings 132 (and therefore based upon the numeric IDs 130 output by the 1st tokenizer 114).

While the memory 108 of the computing system 100 is illustrated as including the tokenizer system 110, the embedder module 122, and the text classifiers 124-126, it is to be understood that the tokenizer system 110, the embedder module 122, and the text classifiers 124-126 may execute on separate computing systems that are in communication with one another.

The computing system 100 exhibits various advantages over conventional computing systems that are configured to perform tokenization of alphanumeric text. In a first example, a single interface is provided to end users, where the plurality of tokenizers 114-116 are accessible to the end users by way of the single interface. The computing system 100 allows an end user to specify a text classifier that is to be employed to perform text classification with respect to alphanumeric text, and the computing system 100 selects an appropriate tokenizer from amongst numerous tokenizers to perform tokenization of the alphanumeric text. In contrast, conventionally, a separate interface is provided for different tokenizers, thereby requiring an end user to specifically identify a tokenizer whose outputs are usable by a text classifier that is to perform text classification. In a second example, one or more of the tokenizers 114-116 have tokenization algorithms that are at least partially implemented by way of the finite state machines 118-120. Accordingly, the tokenizers 114-116 perform tokenization tasks with much more computational efficiency when compared to conventional tokenizers, as the finite state machines 118-120 are deterministic in nature.

Figure 2:
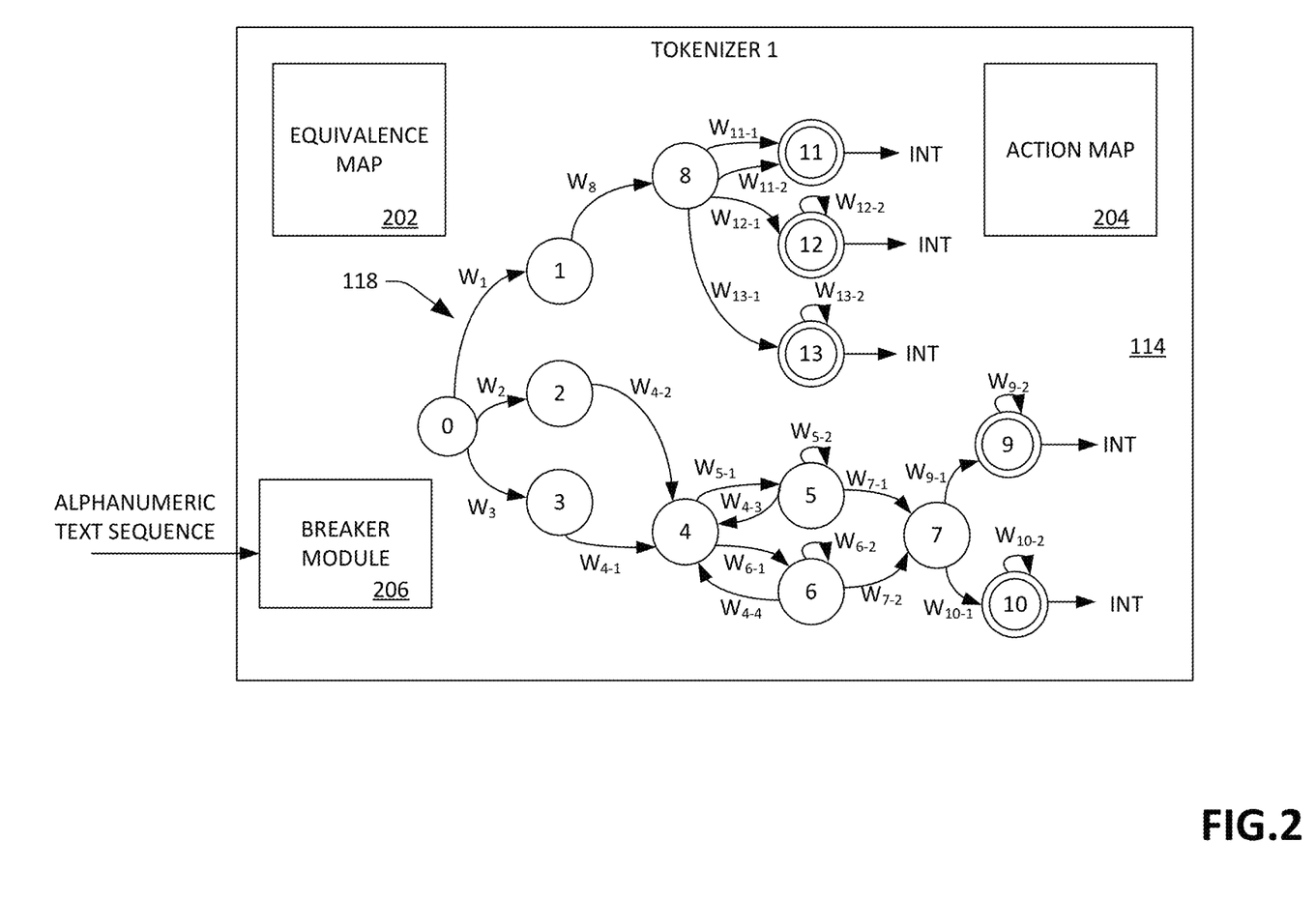
FIG. 2 is a schematic that illustrates a tokenization algorithm implemented as a Moore machine.

Referring now to FIG. 2, a schematic of the first tokenizer 114 is depicted. In the example illustrated in FIG. 2, the first finite state machine 118 included in the first tokenizer 114 implements a Word Piece class tokenization algorithm. As illustrated, the first finite state machine 118 is a minimal deterministic Moore machine. The first finite state machine 118 includes an initial state (state 0) and thirteen other states, labeled 1-13. The first finite state machine 118 also includes numerous transitions between states, where each transition has a weight assigned thereto ($W_1$-$W_{13}$). Final states of the Moore machine (states 9-13) include reaction identifiers (integer numbers).

The first tokenizer 114 additionally includes an equivalence map 202. The equivalence map 202 includes groups of tokens and/or sub-tokens, where tokens and/or sub-tokens in a group are treated equally when the first finite state machine 118 is parsing alphanumeric text. In a specific example, the first finite state machine 118 may treat numerous punctuation characters in the same way, and therefore may be placed together in a group in the equivalence map 202. The equivalence map 202 is an optimization, as it reduces the space required to store the finite state machine 118 in the memory 108. The weights $W_1$-$W_{13}$ on the transitions of the first finite state machine 118 are integer numbers, which correspond to characters or the entries in the equivalence map 202.

The first tokenizer 114 additionally includes an action map 204, where the action map 204 includes entries, where each entry indicates: 1) that a final sub-token has been identified and is to be output; or 2) a different sub-token is to be searched for starting at an identified state (other than the initial state 0). The reaction identifiers of the final states of the Moore machine identify entries in the action map 204.

The first tokenizer 114 further includes a breaker module 206 that performs an initial breaking of alphanumeric text into tokens. For example, the breaker module 206 can break alphanumeric text based upon whitespace between characters.

An example of operation of the first tokenizer 114 is now set forth. The first tokenizer 114 receives the alphanumeric text sequence "amazingly well". The breaker module 206 breaks the alphanumeric text sequence into the tokens "amazingly" and "well", and these tokens are separately provided to the first finite state machine 118. Pursuant to an example, the vocabulary of the first tokenizer 114 includes the sub-tokens "amazing", "ly", and "well", but does not include a sub-token "amazingly". In this example, for instance, the first finite state machine 118 reaches a final state (e.g., state 9), which outputs an integer value. An entry in the action map 204 corresponding to the integer value causes a new entry (e.g., "amazingl") to be created and an updated state (e.g., state 2) to be selected. The first finite state machine 118 can reach an output state (e.g., state 9), which outputs a second integer value. In the action map 204, the second integer value is mapped to a new entry (e.g., "amazing") and an updated state (e.g., state 5). A final state (e.g., state 10) can be reached, which outputs a third integer. The third integer in the action map 204 is mapped to an indication that the entry is a final sub-token (the sub-token "amazing"). Therefore, the first finite state machine 118 is configured to greedily search for combinations of sub-tokens that cover the entirety of each token without overlap, starting with the leftmost position. Thus, for the token "amazingly", the first finite state machine 118 starts at the leftmost position and searches for the longest sub-token in the vocabulary that covers or partially covers the token "amazingly". In this example, the longest sub-token is "amazing", as "amazingly" and "amazingl" are not in the vocabulary of the first tokenizer 114. The first finite state machine then searches from the remaining leftmost position "l" for a sub-token that results in complete coverage of the token "amazingly". Continuing with this example, the first finite state machine 118 identifies "ly" as being a sub-token that, in combination with "amazing", entirely covers the token "amazingly". Numeric IDs that are mapped to the sub-tokens "amazing" and "ly" are then identified and output as part of a sequence of IDs for the alphanumeric text. The first finite state machine 118 then receives the token "well", and, starting at the leftmost position ("w"), searches for the longest sub-token in the vocabulary that covers or partially covers the token. In the example set forth herein, the vocabulary includes the sub-token "well", which covers the entirety of the token "well" output by the breaker module 206. A numeric ID that is mapped to the sub-token "well" is then output as part of the sequence of numeric IDs.

Figure 3:
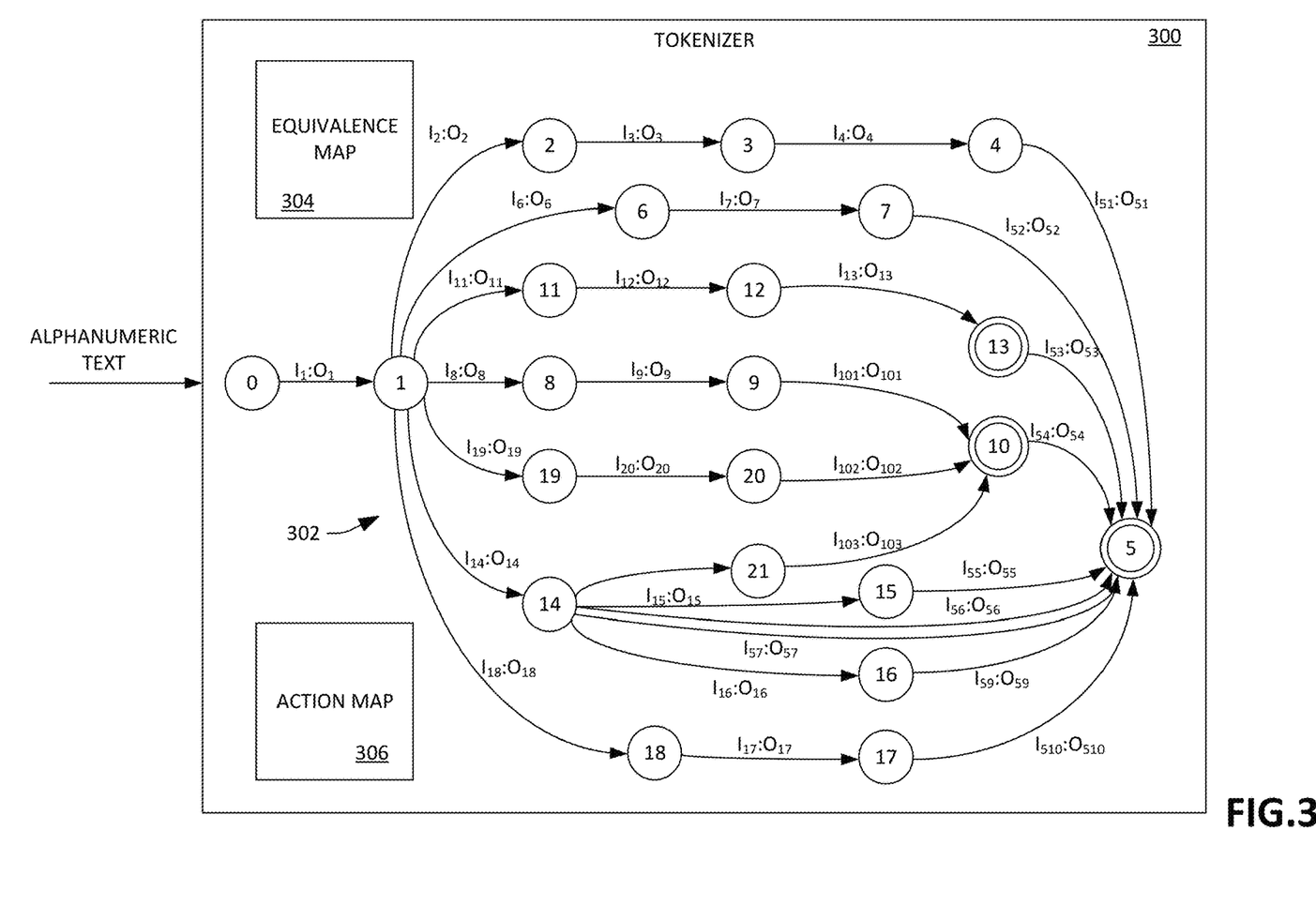
FIG. 3 is a schematic that illustrates a tokenization algorithm implemented as a Mealy machine.

With reference now to FIG. 3, a schematic of a tokenizer 300 is depicted, where the tokenizer 300 is configured to output a sequence of numeric IDs that represent tokens in alphanumeric text based upon scores that are predefined for the tokens in the alphanumeric text. For instance, a predefined score for a token may be indicative of a likelihood of the token being included in an arbitrary block of alphanumeric text (e.g., the predefined score for the token may be indicative of a number of occurrences of the token in training data for the tokenizer 300 relative to numbers of occurrences of other tokens in the training data for the tokenizer 300). Therefore, the tokenizer 300 may be an implementation of the Unigram LM tokenization algorithm. In another example, a predefined score for a token can be indicative of a rank of the token relative to other tokens in the vocabulary of the tokenizer 300. Hence, the tokenizer 300 may be an implementation of the BPE tokenization algorithm.

The tokenizer 300 includes a finite state machine 302, where the finite state machine 302 at least partially implements a Unigram LM class tokenization algorithm or a BPE class tokenization algorithm. In the tokenizer 300, the finite state machine 302 is a minimal deterministic Mealy machine. The finite state machine 302 includes an initial state (state 0) and 21 other states, as well as transitions between the states. Each transition has a pair of weights assigned thereto: input weights $I_1$-$I_{20}$ and output weights $O_1$-$O_{20}$. Similar to the tokenizer 114, the tokenizer 300 includes an equivalence map 304, where the equivalence map 304 includes groupings of tokens that are treated equivalently by the tokenizer 300 when processing alphanumeric text. The input weights can be integers that correspond to characters or entries in the equivalence map 304.

The tokenizer 300 further includes an action map 306, where the action map 306 includes identifiers and scores that are assigned to the identifiers. The identifiers are "internal identifiers", and output weights from the finite state machine 302 sum to different values in the internal identifiers. The internal identifiers are different from the numeric identifiers output by the tokenizer 300, and the internal identifiers are mapped to the predefined scores for the tokens in the action map 306. The output weights result in formation of a minimal perfect hash. Accordingly, the finite state machine 302 is a Mealy machine that implements a minimal perfect hash, rendering the finite state machine 302 efficient when finding possible sub-matches inside a substring of an alphanumeric text string. In contrast to the tokenizer 114, the final states of the finite state machine 302 (e.g., states 5, 10, and 13) do not have a reaction corresponding thereto; rather, the states indicate that the state is final. The output weights of the transitions between states are numbers, where the sum of the numbers along a path provides a unique, internal identifier (ID). The internal ID, which is an integer number, is used as a key in the action map 306, where the action map includes the scores that are assigned to sub-tokens and the (final) IDs. The Mealy machine is used to efficiently find all matches in the vocabulary entries in the input text, and such matches can be represented as a weighted graph, where weights of the weighted graph are logarithmic probabilities. Conventional algorithms can be employed to identify a path in the weighted graph with the highest overall weight (which is output as the best sequence of sub-tokens).

Operation of the tokenizer 300 is now set forth. The tokenizer 300 includes a string of alphanumeric text. The finite state machine 302 identifies all possible combinations of tokens (in sequence) in the vocabulary of the tokenizer 300 within the string of alphanumeric text, and represents the possible combinations as a weighted graph (as noted above). The tokenizer 300 further includes a decoder (not shown), where the decoder is configured to identify the combination of tokens within the string of alphanumeric text that maximizes the scores across all such combinations (e.g., through use of the Viterbi algorithm or other suitable algorithm). Upon the decoder identifying the combination of tokens, the tokenizer 300 outputs a sequence of numeric IDs that are mapped to such tokens.

Figure 4:
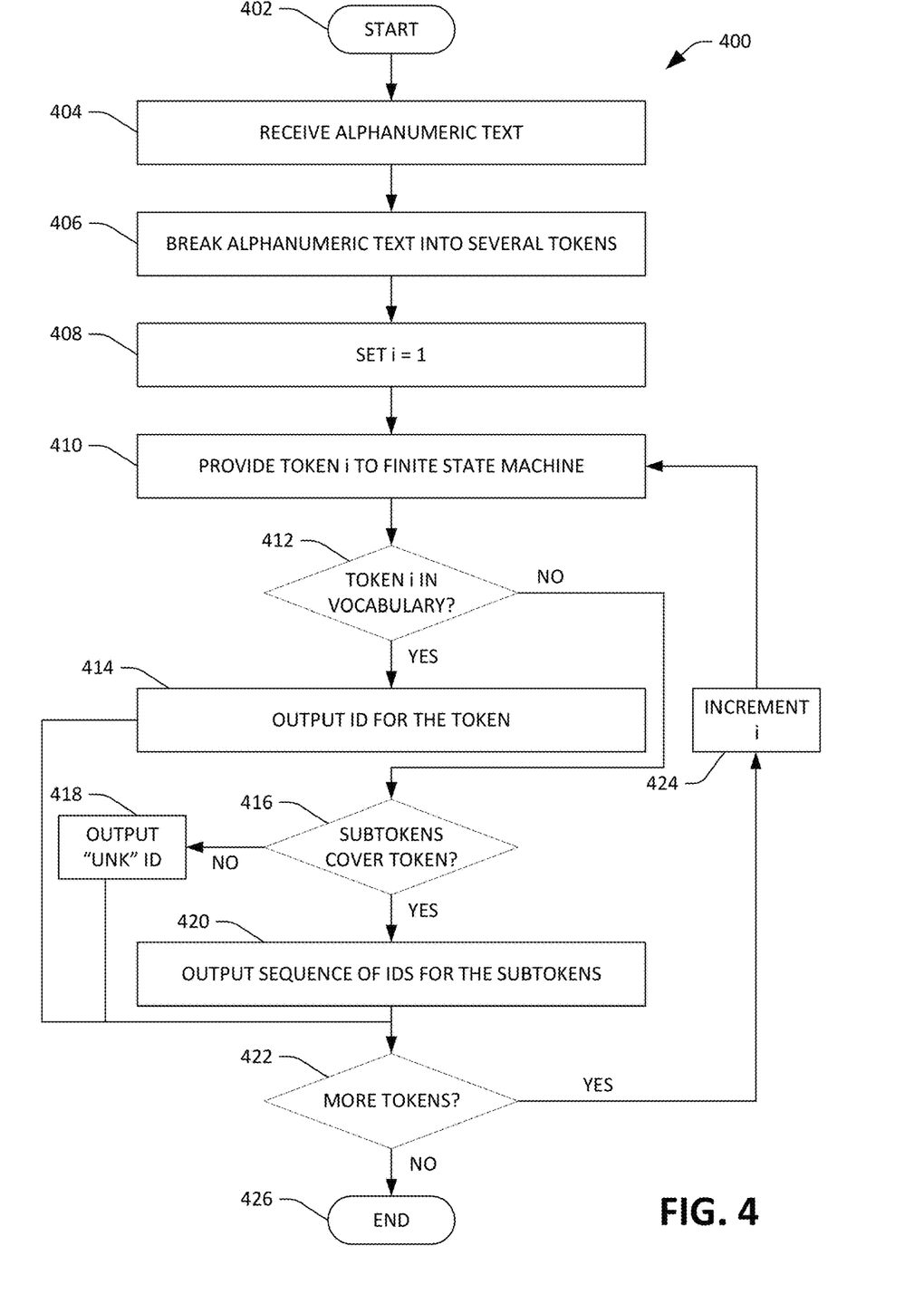
FIG. 4 is a flow diagram illustrating a methodology for tokenizing alphanumeric text through use of a tokenization algorithm implemented as a Moore machine.
Figure 5:
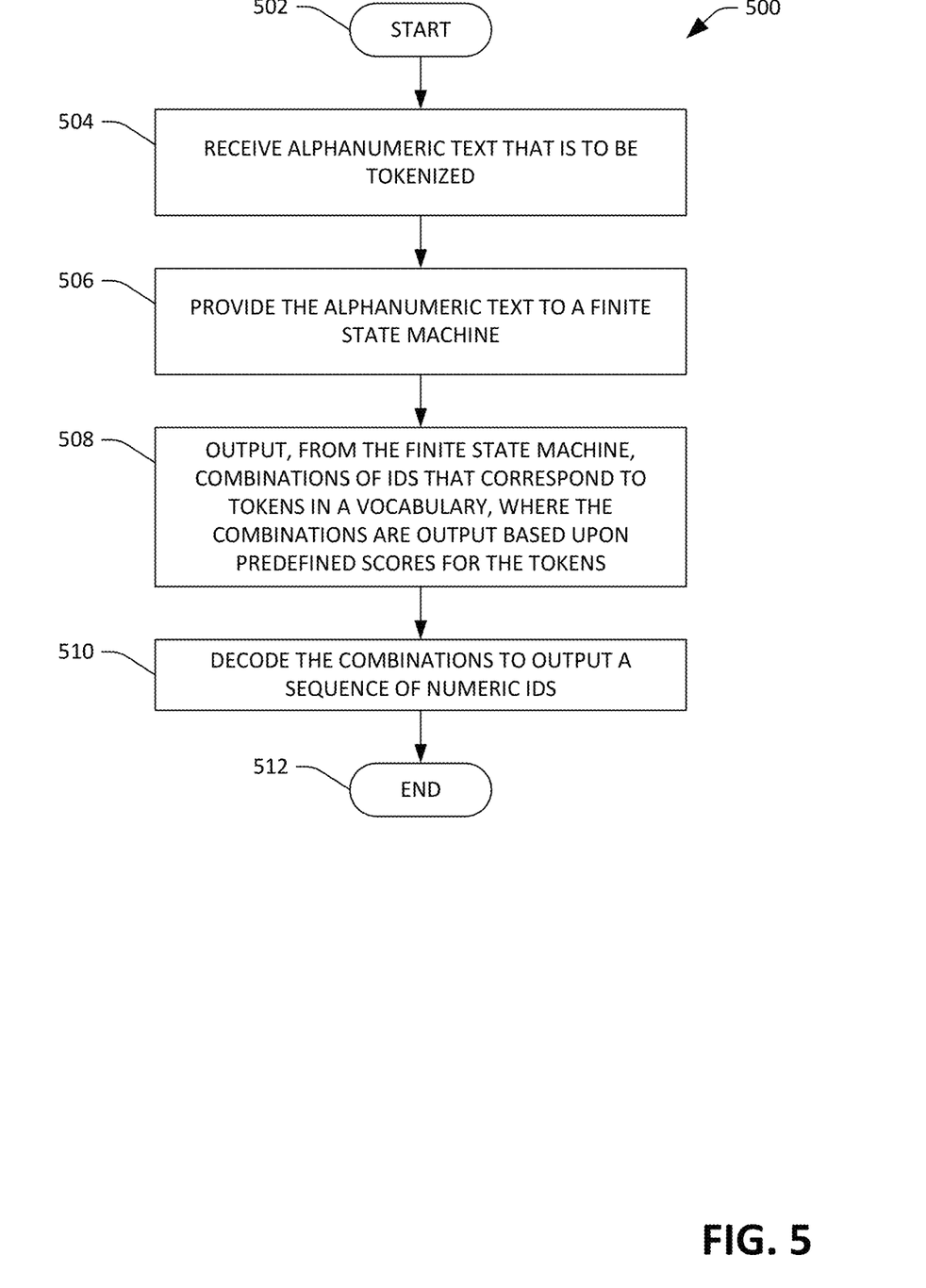
FIG. 5 is a flow diagram illustrating a methodology for tokenizing alphanumeric text through use of a tokenization algorithm implemented as a Mealy machine.
Figure 6:
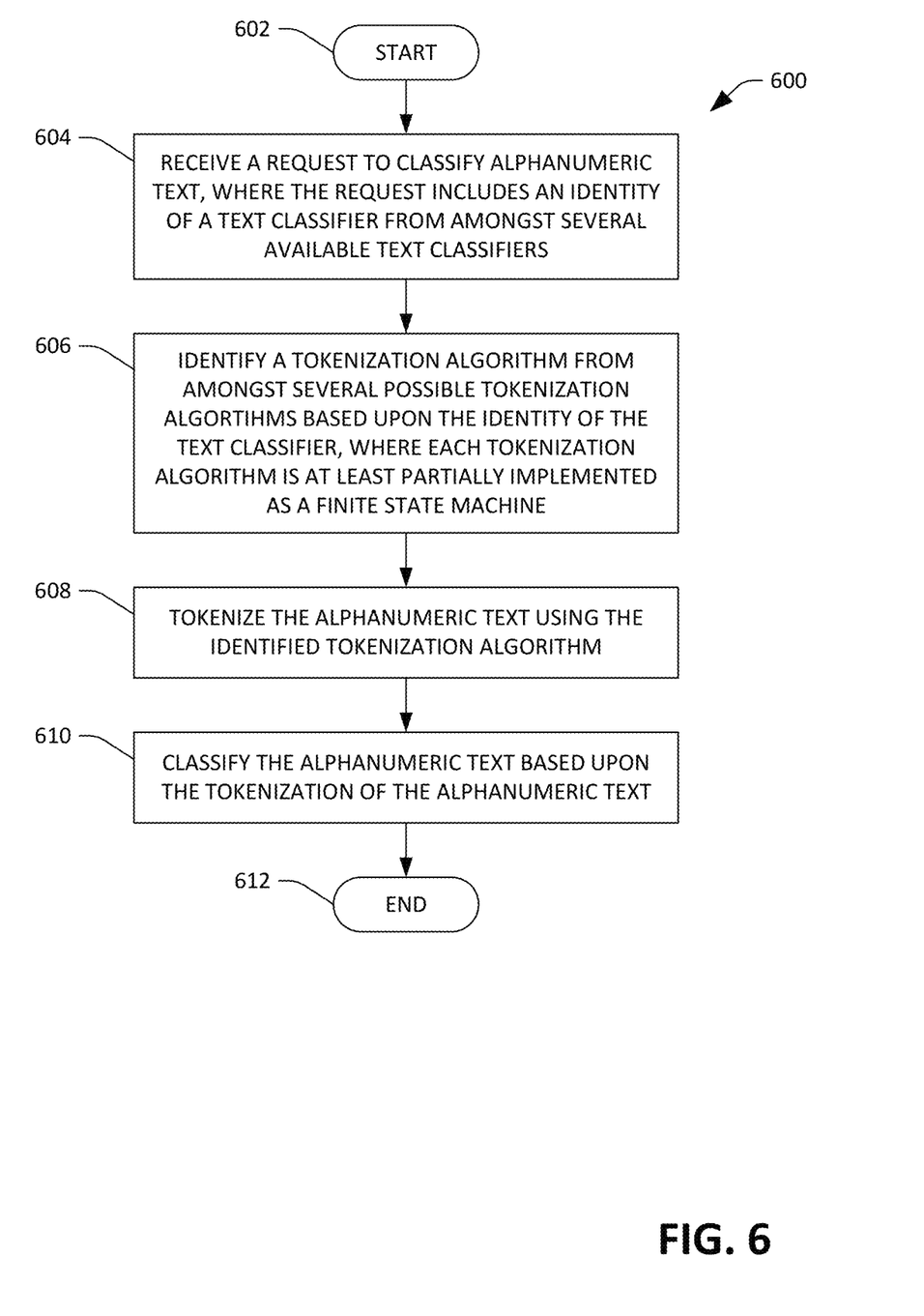
FIG. 6 is a flow diagram illustrating a methodology for identifying a tokenization algorithm from amongst several tokenization algorithms based upon an identity of a text classifier that is to perform text classification with respect to alphanumeric text.

FIGS. 4-6 illustrate methodologies relating to tokenizing alphanumeric text through use of finite state machines. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference solely to FIG. 4, a methodology 400 for tokenizing alphanumeric text is illustrated. The methodology 400 starts at 402, and at 404 alphanumeric text is received. The alphanumeric text may be or include a news story, a product description, a blog post, a social media post, a social media broadcast, etc. At 406, the alphanumeric text is broken into several tokens. As described above the alphanumeric text may be broken based upon white space in the alphanumeric text.

At 408, a variable i is set to 1. At 410, token i is provided to a finite state machine (e.g., a minimal deterministic Moore machine). At 412, a determination is made as to whether token i is in a vocabulary of the tokenizer. When token i is in the vocabulary, at 414 a numeric ID that is mapped to the token is output.

When it is determined at 412 that token i is not in the vocabulary of the tokenizer, the methodology 400 proceeds to 416 where a determination is made as to whether a combination of sub-tokens covers the token. As described previously, a leftmost-longest approach is employed to determine whether a token is covered by a combination of sub-tokens. When it is determined at 416 that there is no combination of sub-tokens that covers the token, then at 418 an "unknown" identifier is output for the token. When it is determined at 416 that the token is covered by a combination of sub-tokens, the methodology 400 proceeds to 420, where a sequence of numeric IDs for the sub-tokens is output.

Upon the ID being output for the token at 414, upon the unknown ID being output at 418, or upon the sequence of IDs for the sub-tokens being output at 420, the methodology 400 proceeds to 422, where a determination is made as to whether there are more tokens in the alphanumeric text. When it is determined at 422 that there are more tokens to process, the methodology 400 proceeds to 424, where i is incremented. Upon i being incremented, the methodology 400 returns to 410. When it is determined at 422 that there are no more tokens in the alphanumeric text, the methodology 400 completes at 426.

Now referring to FIG. 5, a flow diagram illustrating a methodology 500 for tokenizing alphanumeric text through use of a finite state machine is illustrated. The methodology 500 starts at 502, and at 504, alphanumeric text that is to be tokenized is received. At 506, the alphanumeric text is provided to a finite state machine. The finite state machine, in an example, is a minimal deterministic Mealy machine. At 508, combinations of numeric IDs that correspond to tokens in a vocabulary of a tokenizer are output from the finite state machine. The combinations are output based upon predefined scores that are assigned to the tokens. At 510, the combinations are decoded to identify a sequence of numeric IDs, and the sequence of numeric IDs is output by the tokenizer. The methodology 500 completes at 512.

With reference now to FIG. 6, a flow diagram illustrating a methodology 600 for performing text classification with respect to alphanumeric text is illustrated. The methodology 600 starts at 602, and at 604, a request to classify alphanumeric text is received, where the request includes an identity of a text classifier from amongst several available text classifiers. At 606, a tokenization algorithm is identified from amongst several possible tokenization algorithms, where the tokenization algorithm is identified based upon the identity of the text classifier included in the request. Each tokenization algorithm in the several possible tokenization algorithms is at least partially implemented as a finite state machine.

At 608, the alphanumeric text is tokenized using the identified tokenization algorithm. At 610, the alphanumeric text is classified by the text classifier identified in the request, where the alphanumeric text is classified based upon the tokenization of the alphanumeric text performed at 608. The methodology 600 completes at 612.

Figure 7:
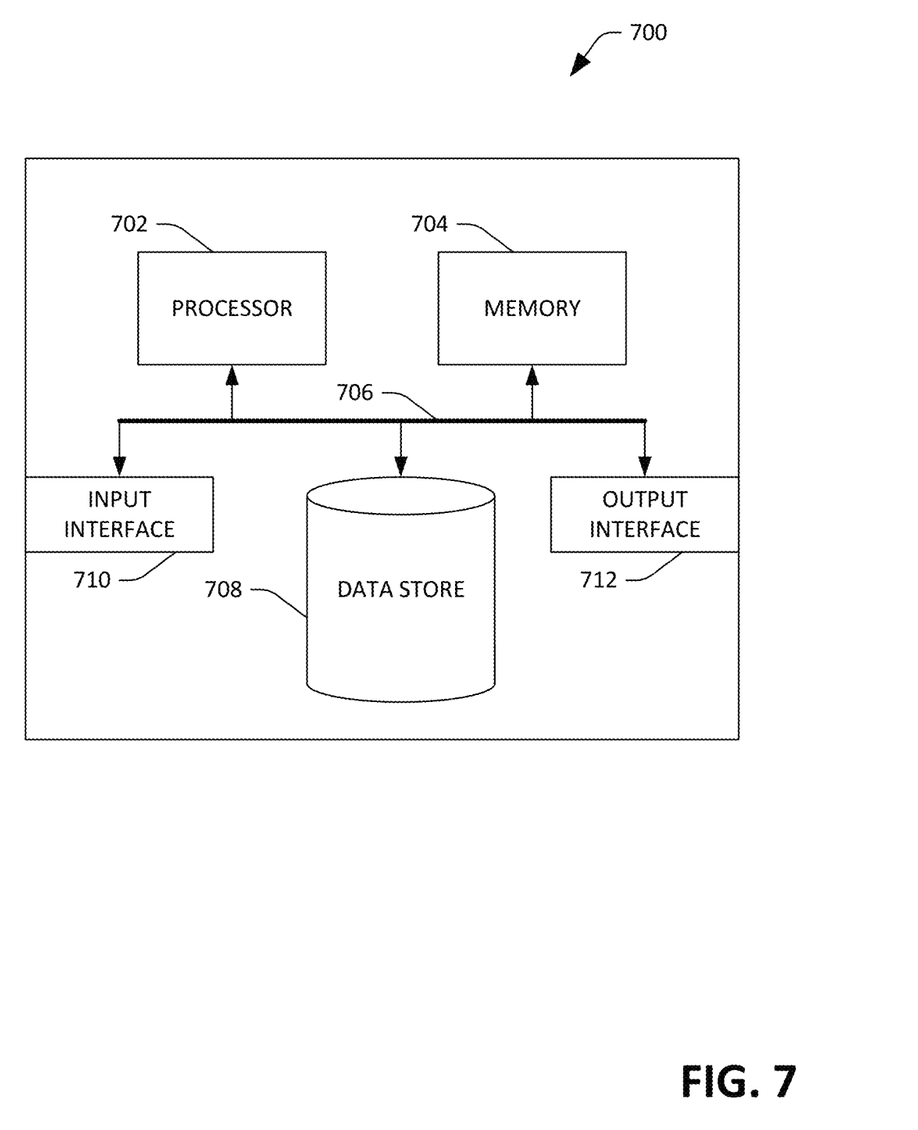
FIG. 7 is a computing system.

Referring now to FIG. 7, a high-level illustration of a computing device 700 that can be used in accordance with the systems and methodologies disclosed herein is illustrated. For instance, the computing device 700 may be used in a system that is configured to perform text classification. By way of another example, the computing device 700 can be used in a system that is configured to perform tokenization of alphanumeric texts through tokenization algorithms that are at least partially implemented as finite state machines. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store predefined scores for tokens, numeric IDs, alphanumeric text, text classifications, etc.

The computing device 700 additionally includes a data store 708 that is accessible by the processor 702 by way of the system bus 706. The data store 708 may include executable instructions, numeric IDs, alphanumeric text, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein relate to tokenizing alphanumeric text through use of tokenization algorithms that are at least partially implemented as finite state machines, according to at least the examples provided below.

(A1) In one aspect, some embodiments include a method executed by at least one processor (e.g., 106) of a computing system (e.g., 100), where the method comprises acts that include receiving alphanumeric text and a request to tokenize the alphanumeric text. The acts further include: based upon the alphanumeric text and further based upon the request, tokenizing the alphanumeric text such that a sequence of numeric identifiers is output, wherein the sequence of numeric identifiers represents the alphanumeric text. Tokenizing the alphanumeric text comprises providing the alphanumeric text to a computer-implemented finite state machine, wherein the finite state machine comprises several states and transitions between states, and further wherein a state in the several states is labeled as an output state. Tokenizing the alphanumeric text further comprises traversing several transitions to reach the output state, a numeric identifier is output based upon a value assigned to the output state. The alphanumeric text is assigned to a class by a text classifier based upon the sequence of numeric identifiers.

(A2) In some embodiments of the method of A1, each numeric identifier in the sequence of numeric identifiers is an integer from amongst a predefined set of integers.

(A3) In some embodiments of any of the methods of A1-A2, the finite state machine is a minimal deterministic finite state machine.

(A4) In some embodiments of any of the methods of A1-A3, the finite state machine is a Moore machine.

(A5) In some embodiments of any of the methods of A1-A3, the finite state machine is a Mealy machine.

(A6) In some embodiments of any of the methods of A1-A5, the acts further include upon tokenizing the alphanumeric text, using embedding technologies to transform the sequence of numeric identifiers into a sequence of vectors, wherein the alphanumeric text is assigned to the class by the text classifier based upon the sequence of vectors.

(A7) In some embodiments of any of the methods of A1-A6, the request to tokenize the alphanumeric text includes an identity of the text classifier, and the acts further include selecting a tokenizer from amongst a plurality of potential tokenizers based upon the identity of the text classifier included in the request, wherein the tokenizer includes the finite state machine.

(A8) In some embodiments of any of the methods of A1-A7, tokens in the alphanumeric text have respective predefined scores assigned thereto, and the sequence of numeric identifiers is output based upon the predefined scores respectively assigned to the tokens.

(A9) In some embodiments of any of the methods of A1-A8, the predefined scores are indicative of frequency of occurrence of the respective tokens in a set of training data used to train a tokenizer that performs the tokenizing of the alphanumeric text.

(B1) In another aspect, some embodiments include a method executed by at least one processor (e.g., 106) of a computing system (e.g., 100), where the method comprises acts that include receiving a request to tokenize alphanumeric text that includes a word. The acts further include tokenizing the alphanumeric text such that a sequence of numeric identifiers that represents the alphanumeric text is output. Tokenizing the alphanumeric text includes providing the alphanumeric text to a computer-implemented finite state machine, where the finite state machine includes a final state. Tokenizing the alphanumeric text further includes outputting at least one numeric identifier as a representation of the word based upon a value assigned to the final state of the computer-implemented finite state machine. The at least one numeric identifier is identified from a predefined set of numeric identifiers, and further a class is assigned to the alphanumeric text by a computer-implemented text classifier based upon the output sequence of numeric identifiers.

(B2) In some embodiments of the method of (B1), the finite state machine outputs numerous numeric identifiers as the representation of the word in the alphanumeric text.

(B3) In some embodiments of any of the methods of B1-B2, the finite state machine is a Moore machine.

(B4) In some embodiments of any of the methods of B1-B2, the finite state machine is a Mealy machine.

(B5) In some embodiments of any of the methods of B1-B4, tokenizing the alphanumeric text comprises generating the sequence of numeric identifiers based upon a score previously assigned to a token included in the word.

(B6) In some embodiments of any of the methods of B1-B5, the score is indicative of a likelihood of the token being included in an arbitrary block of text.

(B7) In some embodiments of any of the methods of B1-B5, the score is indicative of a rank of the token relative to other tokens in a predefined vocabulary.

(B8) In some embodiments of any of the methods of B1-B7, the request includes an indication that the computer-implemented text classifier is to assign the class to the alphanumeric text, tokenizing is performed by a tokenizer, and the acts further include selecting the tokenizer from amongst a plurality of available tokenizers based upon the indication in the request. The acts also include upon selecting the tokenizer, providing the alphanumeric text to the tokenizer.

(B9) In some embodiments of any of the methods of B1-B8, the finite state machine is a minimal deterministic finite state machine.

(B10) In some embodiments of the method of B1, tokenizing the alphanumeric text further includes identifying several different possible sequences of tokens in the alphanumeric text. Tokenizing the alphanumeric text also includes identifying a sequence of tokens from amongst the different possible sequences of tokens based upon predefined scores assigned to the tokens, wherein the sequence of numeric identifiers represents the sequence of tokens.

(C1) In yet another aspect, some embodiments include a method executed by at least one processor (e.g., 106) of a computing system (e.g., 100), where the method comprises acts that include receiving a request to tokenize alphanumeric text using a tokenization algorithm that belongs to a Word Piece class of tokenization algorithms. The acts also include based upon the request, tokenizing the alphanumeric text using the tokenization algorithm to output a sequence of numeric identifiers, wherein the tokenization algorithm is at least partially implemented as a deterministic finite state machine. Tokenizing the alphanumeric text includes providing the alphanumeric text as input to the deterministic finite state machine. Tokenizing the alphanumeric text also includes outputting a numeric identifier that is representative of a token in the alphanumeric text based upon a value assigned to a final state of the deterministic finite state machine. The alphanumeric text is assigned a class by a computer-implemented text classifier based upon the sequence of numeric identifiers.

(D1) In another aspect, some embodiments include a computing system (e.g., 100) that includes a processor (e.g., 106) and memory (e.g., 108), where the memory includes instructions that, when executed by the processor, cause the processor to perform any of the methods described herein (e.g., any of A1-A9, B1-B10, and/or C1).

(E1) In still another aspect, a computer-readable storage medium comprises instructions that, when executed by a processor (e.g., 106) of a computing system (e.g., 100), cause the processor to perform any of the methods described herein (e.g., any of A1-A9, B1-B10, and/or C1).

In the foregoing description, for purposes of explanation, numerous specific details were set forth in order to provide a thorough understanding of one or more aspects. It may be evident, however, that such aspect(s) may be practiced without these specific details. In other instances, well-known structures and devices were shown in block diagram form in order to facilitate describing one or more aspects. Further, it is to be understood that functionality described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
   receiving a request to tokenize alphanumeric text that includes a word; and
   tokenizing the alphanumeric text such that a sequence of numeric identifiers that represents the alphanumeric text is output, wherein tokenizing the alphanumeric text comprises:
   providing the alphanumeric text to a computer-implemented finite state machine, where the finite state machine includes a final state;
   generating at least one token for the word based upon a value assigned to the final state of the computer-implemented finite state machine, where each token in the at least one token is included in a predefined vocabulary employed by the computing system when tokenizing text; and
   outputting at least one numeric identifier as a representation of the word based upon the at least one token,
   wherein the at least one numeric identifier is identified from a predefined set of numeric identifiers, and further wherein a class is assigned to the alphanumeric text by a computer-implemented text classifier based upon the output sequence of numeric identifiers.

2. The computing system of claim 1, wherein the finite state machine outputs numerous numeric identifiers as the representation of the word in the alphanumeric text.

3. The computing system of claim 1, wherein the finite state machine is a Moore machine.

4. The computing system of claim 1, wherein the finite state machine is a Mealy machine.

5. The computing system of claim 1, wherein tokenizing the alphanumeric text comprises generating the sequence of numeric identifiers based upon a score previously assigned to a token included in the word.

6. The computing system of claim 5, wherein the score is indicative of a likelihood of the token being included in an arbitrary block of text.

7. The computing system of claim 5, wherein the score is indicative of a rank of the token relative to other tokens in a predefined vocabulary.

8. The computing system of claim 1, wherein the request includes an indication that the computer-implemented text classifier is to assign the class to the alphanumeric text, wherein tokenizing is performed by a tokenizer, the acts further comprising:
   selecting the tokenizer from amongst a plurality of available tokenizers based upon the indication in the request; and
   upon selecting the tokenizer, providing the alphanumeric text to the tokenizer.

9. The computing system of claim 1, wherein the finite state machine is a minimal deterministic finite state machine.

10. The computing system of claim 1, wherein tokenizing the alphanumeric text comprises:
    identifying several different possible sequences of tokens in the alphanumeric text; and
    identifying a sequence of tokens from amongst the different possible sequences of tokens based upon predefined scores assigned to the tokens, wherein the sequence of numeric identifiers represents the sequence of tokens.

* * * * *